(12) United States Patent
Masui

(10) Patent No.: US 8,311,650 B2
(45) Date of Patent: Nov. 13, 2012

(54) EQUIPMENT MANAGEMENT SYSTEM, PROGRAMMABLE CONTROLLER AND CENTRALIZED CONTROLLER

(75) Inventor: Hirotaka Masui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 410 days.

(21) Appl. No.: 12/373,629

(22) PCT Filed: Jul. 13, 2006

(86) PCT No.: PCT/JP2006/313981
§ 371 (c)(1),
(2), (4) Date: Jan. 13, 2009

(87) PCT Pub. No.: WO2008/007434
PCT Pub. Date: Jan. 17, 2008

(65) Prior Publication Data
US 2010/0004758 A1    Jan. 7, 2010

(51) Int. Cl.
*G05B 19/05* (2006.01)
*G05B 9/02* (2006.01)

(52) U.S. Cl. .............................. 700/9; 700/79

(58) Field of Classification Search ............ 700/59, 700/9
See application file for complete search history.

(56) References Cited

U.S. PATENT DOCUMENTS

| | | | |
|---|---|---|---|
| 5,678,568 A | 10/1997 | Uchikubo et al. | |
| 5,724,425 A * | 3/1998 | Chang et al. ............. | 705/52 |
| 7,225,037 B2 * | 5/2007 | Shani ........................ | 700/18 |
| 7,294,056 B2 * | 11/2007 | Lowell et al. ............. | 463/17 |
| RE40,817 E * | 6/2009 | Krivoshein et al. ....... | 700/1 |
| 2002/0016639 A1 * | 2/2002 | Smith et al. ............... | 700/9 |
| 2003/0140637 A1 * | 7/2003 | Masui et al. .............. | 62/127 |
| 2004/0198494 A1 * | 10/2004 | Nguyen et al. ........... | 463/42 |
| 2005/0085928 A1 | 4/2005 | Shani | |
| 2005/0119767 A1 * | 6/2005 | Kiwimagi et al. ........ | 700/19 |
| 2005/0216579 A1 * | 9/2005 | Yang et al. ................ | 709/223 |
| 2005/0228877 A1 * | 10/2005 | Monitzer et al. .......... | 709/223 |
| 2006/0136077 A1 | 6/2006 | Kuwatani | |
| 2007/0089438 A1 * | 4/2007 | Singh et al. ............... | 62/129 |
| 2007/0211691 A1 * | 9/2007 | Barber et al. ............. | 370/351 |
| 2007/0233323 A1 * | 10/2007 | Wiemeyer et al. ........ | 700/276 |
| 2007/0261051 A1 * | 11/2007 | Porter et al. .............. | 717/174 |

FOREIGN PATENT DOCUMENTS

| | | |
|---|---|---|
| DE | 102 60 884 | 7/2004 |
| JP | 9-257297 A | 9/1997 |
| JP | 2001-197662 A | 7/2001 |

(Continued)

OTHER PUBLICATIONS

Supplementary European Search Report issued in the corresponding Application No. 06768195.7-1239 dated Apr. 14, 2010.
International Search Report for PCT/JP2006/313981 completed Oct. 6, 2006.
Office Action mailed Feb. 13, 2012 in corresponding CN application No. 200680055117.3.

(Continued)

*Primary Examiner* — Kakali Chaki
*Assistant Examiner* — Walter Hanchak
(74) *Attorney, Agent, or Firm* — Posz Law Group, PLC

(57) ABSTRACT

A centralized controller 2 controls facility equipment 3a and 3b according to a sequence control program corresponding to standard functions of the facility equipment 3a and 3b. In addition, the centralized controller 2 receives control information for controlling a unique function of the facility equipment 3a and 3b and a PIN code, which are transmitted from a programmable controller 1, and transmits, if the PIN code is a valid code, the control information to the facility equipment 3a and 3b.

19 Claims, 7 Drawing Sheets

FOREIGN PATENT DOCUMENTS

| | | |
|---|---|---|
| JP | 2004-151807 A | 5/2004 |
| JP | 2005-165402 A | 6/2005 |
| JP | A-2005-215783 | 8/2005 |

OTHER PUBLICATIONS

Office Action mailed Jan. 4, 2012 in corresponding JP application No. 2008-524702 (with English translation.).

\* cited by examiner

EQUIPMENT MANAGEMENT SYSTEM, PROGRAMMABLE CONTROLLER AND CENTRALIZED CONTROLLER

TECHNICAL FIELD

The present invention relates to an equipment management system for carrying out maintenance, management, control and service of facility equipment such as air conditioners and refrigerators used for multipurpose facilities such as buildings and stores, and to a programmable controller and a centralized controller constituting the equipment management system.

BACKGROUND ART

As for a conventional equipment management system, a facility equipment maker manufacturing facility equipment such as air conditioners and refrigerators, for example, develops centralized controllers for managing the facility equipment independently, and has the centralized controllers perform all the control necessary for the facility equipment (see Patent Document 1, for example).

Accordingly, the centralized controller must be equipped not only with a sequence control program corresponding to the standard functions of the facility equipment, but also with a sequence control program corresponding to a unique function of the facility equipment.

Since the sequence control program corresponding to the unique function of the facility equipment varies according to the unique function of the facility equipment, it is necessary to revise an existing sequence control program or to develop a new sequence control program in accordance with the unique function of the facility equipment.

However, since the sequence control program installed in the centralized controller is generally written with a special program language suitable for control, operation and the like, it is difficult for those other than engineers having a thorough knowledge of the program language to revise or develop it.

Thus, considering a development period or development costs of the program, it is difficult for the centralized controller to always cope with the unique functions of the facility equipment.

Besides the foregoing equipment management system, a system is developed which handles all the control necessary for the facility equipment with a programmable controller (see Patent Document 2, for example).

A sequence control program installed in the programmable controller has an advantage over the sequence control program installed in the centralized controller in that a user can create or revise it easily without knowledge of the program language.

However, since the program volume of the sequence control program expands to achieve fine control of the facility equipment with the programmable controller, it is necessary to prepare an expensive programmable controller, which makes it difficult to construct an inexpensive equipment management system.

Incidentally, since ordinary equipment suppliers who create sequence control programs and cope with individual apparatuses have usually little technical knowledge about specific facility equipment (such as air conditioners), it is difficult for them to realize the fine control of the facility equipment with the programmable controller.

Patent Document 1: Japanese Patent Laid-Open No. 9-257297/1997 (Paragraphs [0025] to [0026], and FIG. 2).

Patent Document 2: Japanese Patent Laid-Open No. 2001-197662 (Paragraph [0025], and FIG. 1).

With the foregoing configurations, the conventional equipment management systems have problems in that they have difficulty in coping with the unique functions of the facility equipment with the centralized controller, and that if they try to perform the fine control of the facility equipment with the programmable controller, they must prepare an expensive programmable controller because of the great program volume of the sequence control program.

The present invention is implemented to solve the foregoing problems. Therefore it is an object of the present invention to provide an equipment management system capable of coping with the unique functions of the facility equipment easily without using the expensive programmable controller.

Another object of the present invention is to provide a programmable controller and centralized controller applicable to the equipment management system capable of coping with the unique functions of the facility equipment easily.

DISCLOSURE OF THE INVENTION

An equipment management system in accordance with the present invention is configured in such a manner that the centralized controller controls facility equipment according to a control program corresponding to standard functions of the facility equipment, and that the centralized controller receives control information for controlling a unique function of the facility equipment and a PIN code, which are transmitted from a programmable controller, and transmits, if the PIN code is a valid code, the control information to the facility equipment.

This offers an advantage of being able to cope with the unique function of the facility equipment easily without using an expensive programmable controller.

BEST MODE FOR CARRYING OUT THE
INVENTION

The best mode for carrying out the invention will now be described with reference to the accompanying drawings to explain the present invention in more detail.

Embodiment 1

Figure 1:
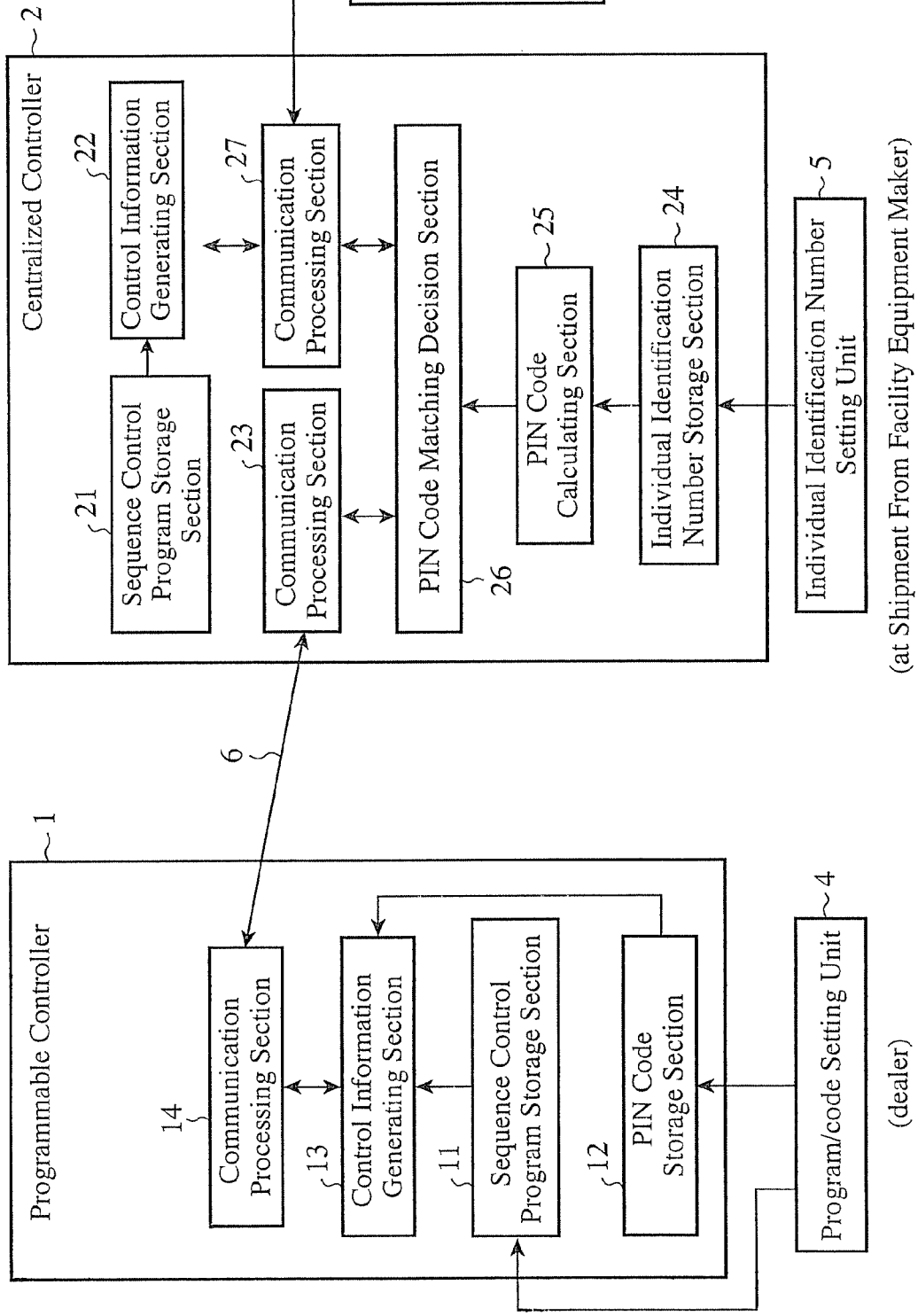
FIG. 1 is a block diagram showing a configuration of an equipment management system of an embodiment 1 in accordance with the present invention.

FIG. 1 is a block diagram showing a configuration of an equipment management system of an embodiment 1 in accordance with the present invention. In FIG. 1, a programmable controller 1 accepts a sequence control program corresponding to a unique function of facility equipment 3a and 3b and the setting of a PIN (Personal Identity Number) code which is an identification code; generates control information of the facility equipment 3a and 3b by executing the sequence control program; and executes processing such as outputting the control information and PIN code of the facility equipment 3a and 3b to a centralized controller 2.

The centralized controller 2 is connected to the programmable controller 1 via a transmission line 6 and to the facility equipment 3a and 3b via a transmission line 7. The centralized controller 2 controls the facility equipment 3a and 3b according to the sequence control program corresponding to the standard functions of the facility equipment 3a and 3b; receives the control information and PIN code transmitted from the programmable controller 1 via the transmission line 6; and executes, if the PIN code is a valid code, processing such as transmitting the control information to the facility equipment 3a and 3b via the transmission line 7.

A program/code setting unit 4 carries out processing of setting the sequence control program corresponding to the unique function of the facility equipment 3a and 3b and the PIN code to the programmable controller 1.

An individual identification number setting unit 5 carries out processing of setting the individual identification number (such as the manufacturer's serial number) of the facility equipment 3a and 3b to the centralized controller 2.

A sequence control program storage section 11 of the programmable controller 1 is a memory that accepts the setting processing of the sequence control program by the program/code setting unit 4, and stores the sequence control program corresponding to the unique function of the facility equipment 3a and 3b.

A PIN code storage section 12 of the programmable controller 1 is a memory that accepts the setting processing of the PIN code by the program/code setting unit 4 and stores the PIN code.

Here, the sequence control program storage section 11 and the PIN code storage section 12 constitute a storage means.

A control information generating section 13 of the programmable controller 1, which is composed of a processing unit such as a CPU, executes the sequence control program stored in the sequence control program storage section 11, generates the control information for the facility equipment 3a and 3b, and carries out processing of outputting the control information and the PIN code stored in the PIN code storage section 12 to a communication processing section 14. Here, the control information generating section 13 constitutes a control information generating means.

The communication processing section 14 of the programmable controller 1, which has a communication interface with the transmission line 6, carries out processing such as transmitting the control information for the facility equipment 3a and 3b and the PIN code output from the control information generating section 13 to the centralized controller 2, and receiving the state information about the facility equipment 3a and 3b transmitted from the centralized controller 2. Here, the communication processing section 14 constitutes a communication means.

A sequence control program storage section 21 of the centralized controller 2 is a memory that stores the sequence control program corresponding to the standard functions of the facility equipment 3a and 3b.

A control information generating section 22 of the centralized controller 2, which is composed of a processing unit such as a CPU, carries out processing such as generating the control information for the facility equipment 3a and 3b by executing the sequence control program stored in the sequence control program storage section 21, and outputting the control information to a communication processing section 27. Here, the control information generating section 22 constitutes a facility equipment control means.

A communication processing section 23 of the centralized controller 2, which has a communication interface with the transmission line 6, carries out processing such as receiving the control information for the facility equipment 3a and 3b and the PIN code transmitted from the programmable controller 1, and transmitting the state information about the facility equipment 3a and 3b to the programmable controller 1. Here, the communication processing section 23 constitutes a receiving means.

An individual identification number storage section 24 of the centralized controller 2 is a memory for accepting the setting of the individual identification number of the facility equipment 3a and 3b by the individual identification number setting unit 5, and for storing the individual identification number.

A PIN code calculating section 25 of the centralized controller 2 carries out processing of calculating the PIN code from the individual identification number stored in the individual identification number storage section 24.

A PIN code matching decision section 26 of the centralized controller 2, which is composed of a processing unit such as a CPU, carries out processing such as comparing the PIN code calculated by the PIN code calculating section 25 with the PIN code received by the communication processing section 23, authenticating, if they agree, that the PIN code received by the communication processing section 23 is a valid code, outputting the control information for the facility equipment 3a and 3b received by the communication processing section 23 to the communication processing section 27, and outputting the state information about the facility equipment 3a and 3b received by the communication processing section 27 to the communication processing section 23.

Here, the individual identification number storage section 24, PIN code calculating section 25 and PIN code matching decision section 26 constitute a decision means.

The communication processing section 27 of the centralized controller 2, which has a communication interface with the transmission line 7, carries out processing of transmitting to the facility equipment 3a and 3b the control information for the facility equipment 3a and 3b output from the PIN code matching decision section 26 (control information for controlling the unique function of the facility equipment 3a and 3b), and the control information for the facility equipment 3a and 3b output from the control information generating section 22 (control information for controlling the standard functions of the facility equipment 3a and 3b); and processing of receiving the state information from the facility equipment 3a and 3b, and outputting the state information to the PIN code matching decision section 26 and the control information generating section 22. Here, the communication processing section 27 constitutes a transmitting means.

Figure 2:
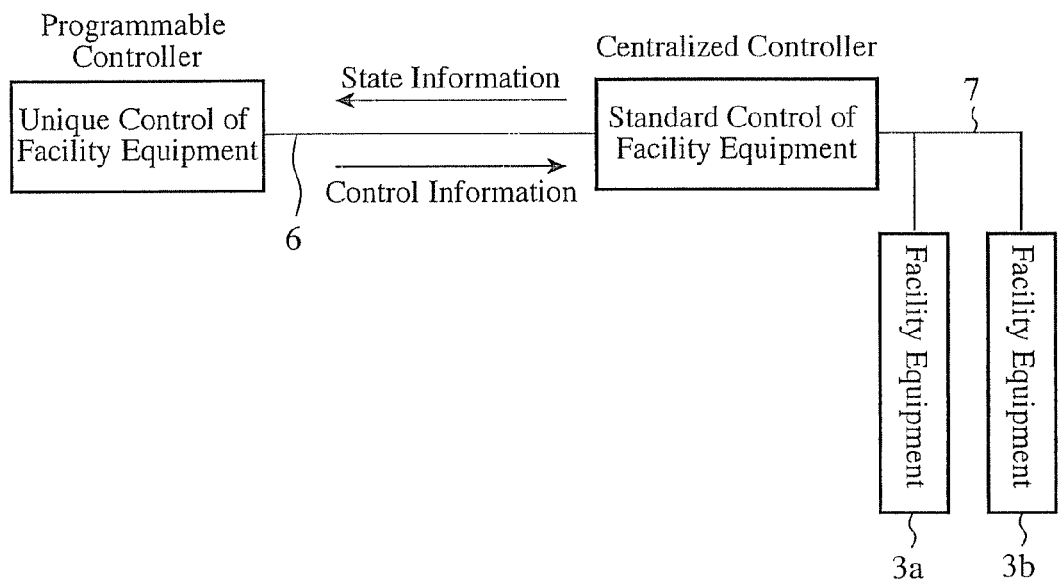
FIG. 2 is a diagram showing schematic operation of the equipment management system of the embodiment 1 in accordance with the present invention.
Figure 3:
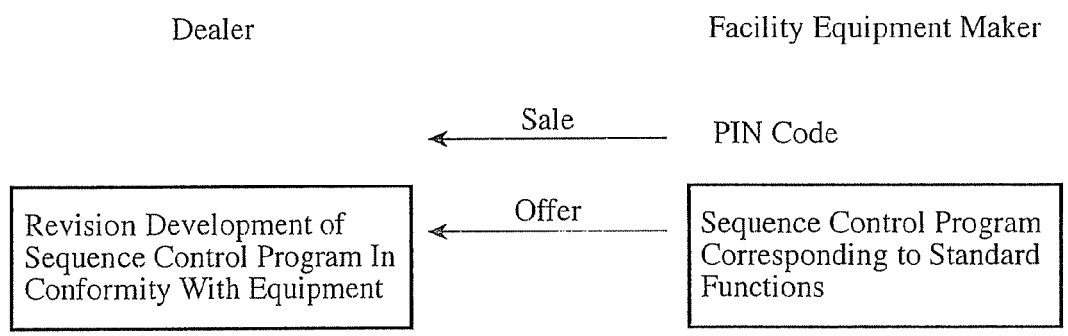
FIG. 3 is a diagram for explaining physical distribution of the equipment management system of the embodiment 1 in accordance with the present invention.

FIG. 2 is a diagram showing schematic operation of the equipment management system of the embodiment 1 in accordance with the present invention; and FIG. 3 is a diagram for explaining physical distribution of the equipment management system of the embodiment 1 in accordance with the present invention.

Figure 4:
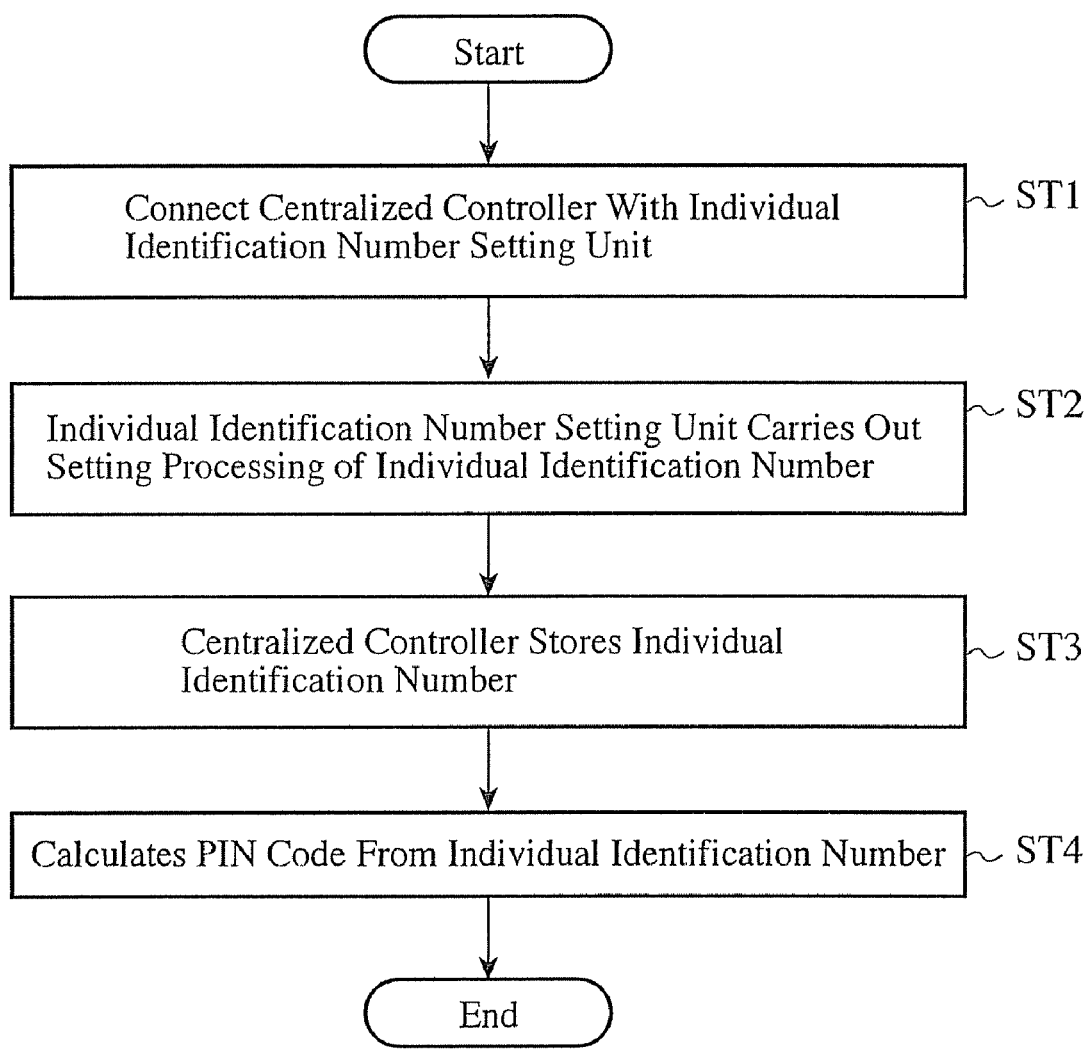
FIG. 4 is a flowchart showing processing contents of the equipment management system of the embodiment 1 in accordance with the present invention.
Figure 5:
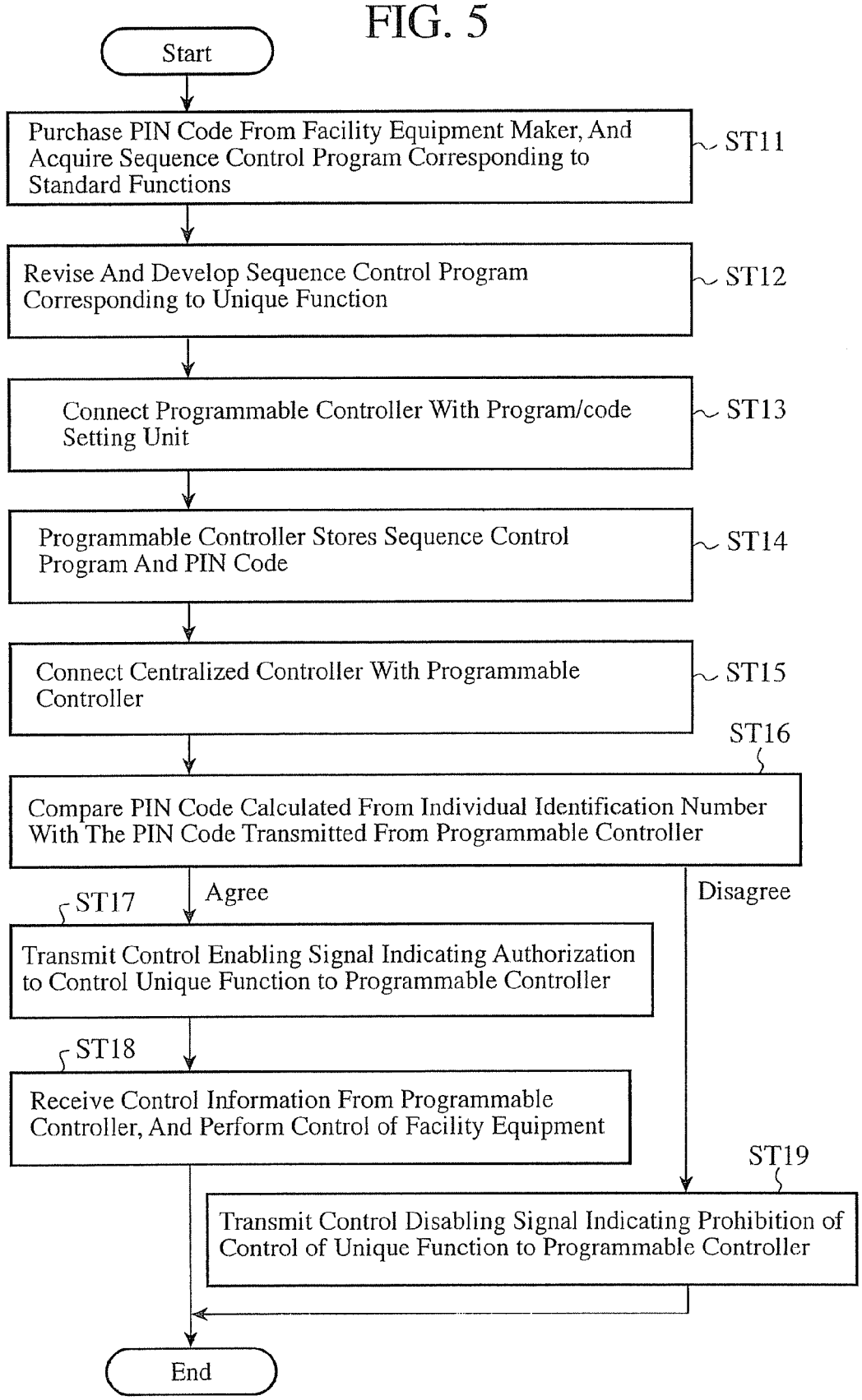
FIG. 5 is a flowchart showing processing contents of the equipment management system of the embodiment 1 in accordance with the present invention.

FIG. 4 and FIG. 5 are flowcharts showing processing contents of the equipment management system of the embodiment 1 in accordance with the present invention.

Next, the operation will be described.

When shipping the centralized controller 2, for example, the facility equipment maker connects the centralized controller 2 with the individual identification number setting unit 5 (step ST1).

In the example of FIG. 1, the individual identification number setting unit 5 is connected to the individual identification number storage section 24 of the centralized controller 2. However, the individual identification number storage section 24 can be connected to the transmission line 6 so that the individual identification number storage section 24 of the centralized controller 2 is connected with the individual identification number setting unit 5 via the communication processing section 23.

When the individual identification number setting unit 5 is connected to the centralized controller 2, it carries out the processing of setting the individual identification number (such as the manufacturer's serial number) of the facility equipment 3a and 3b to the centralized controller 2 (step ST2).

Thus, the individual identification number storage section 24 of the centralized controller 2 accepts the setting of the individual identification number of the facility equipment 3a and 3b by the individual identification number setting unit 5, and stores the individual identification number of the facility equipment 3a and 3b (step ST3).

When the individual identification number is stored in the individual identification number storage section 24, the PIN code calculating section 25 of the centralized controller 2 calculates the PIN code that is determined uniquely from the individual identification number (step ST4).

As for the PIN code, it is obtained by substituting the individual identification number into the following PIN converting formula, which is not open to a dealer of the facility equipment 3a and 3b.

PIN code=PIN converting formula[individual identification number]

After ending the setting of the individual identification number of the facility equipment 3a and 3b to the centralized controller 2, the individual identification number setting unit 5 is removed from the centralized controller 2.

When receiving an order contract or the like for the facility equipment 3a and 3b from a customer, for example, a dealer purchases the PIN code from the facility equipment maker as shown in FIG. 3, and acquires the sequence control program corresponding to the standard functions of the facility equipment 3a and 3b from the facility equipment maker (step ST11).

When acquiring the sequence control program corresponding to the standard functions of the facility equipment 3a and 3b from the facility equipment maker, the dealer makes a revision of the sequence control program in such a manner as to fulfill the unique function of the facility equipment 3a and 3b the customer requires (step ST12).

Although an example is described here which develops the sequence control program corresponding to the unique function of the facility equipment 3a and 3b by making a revision of the sequence control program corresponding to the standard functions of the facility equipment 3a and 3b, it is also possible for the dealer to operate the program/code setting unit 4 (or the programmable controller 1) to develop the sequence control program corresponding to the unique function of the facility equipment 3a and 3b.

Having developed the sequence control program corresponding to the unique function of the facility equipment 3a and 3b, the dealer connects the program/code setting unit 4 to the programmable controller 1 (step ST13).

Although the program/code setting unit 4 is connected to the sequence control program storage section 11 and PIN code storage section 12 of the programmable controller 1 in the example of FIG. 1, another configuration is also possible in which the program/code setting unit 4 is connected to the transmission line 6 so that the program/code setting unit 4 is connected to the sequence control program storage section 11 and PIN code storage section 12 of the programmable controller 1 via the communication processing section 14.

When connected to the programmable controller 1, the program/code setting unit 4 carries out the processing of setting the sequence control program corresponding to the unique function of the facility equipment 3a and 3b and the PIN code to the programmable controller 1.

Thus, the sequence control program storage section 11 of the programmable controller 1 accepts the setting of the sequence control program corresponding to the unique function by the program/code setting unit 4, and stores the sequence control program.

In addition, the PIN code storage section 12 of the programmable controller 1 accepts the setting of the PIN code by the program/code setting unit 4, and stores the PIN code (step ST14).

After the setting of the sequence control program and the PIN code to the programmable controller 1 has been completed, the program/code setting unit 4 is removed from the programmable controller 1, and the programmable controller 1 is connected to the centralized controller 2 via the transmission line 6 (step ST15).

If the control information generating section 13 of the programmable controller 1 detects the connection of the communication processing section 14 to the centralized controller 2, it supplies the PIN code stored in the PIN code storage section 12 to the communication processing section 14.

Receiving the PIN code from the control information generating section 13, the communication processing section 14 of the programmable controller 1 transmits the PIN code to the centralized controller 2 via the transmission line 6.

Receiving the PIN code transmitted from the programmable controller 1, the communication processing section 23 of the centralized controller 2 outputs the PIN code to the PIN code matching decision section 26.

Receiving the PIN code transmitted from the programmable controller 1, the PIN code matching decision section 26 of the centralized controller 2 compares the PIN code with the PIN code calculated by the PIN code calculating section 25 (step ST16).

If the two PIN codes match, the PIN code matching decision section 26 of the centralized controller 2 authenticates that the PIN code transmitted from the programmable controller 1 is a valid code, and transmits a control enabling signal, which authorizes the control of the unique function of the facility equipment 3a and 3b, to the programmable controller 1 via the communication processing section 23 (step ST17).

In addition, when the communication processing section 27 receives the state information about the facility equipment 3a and 3b, the PIN code matching decision section 26 transmits the state information about the facility equipment 3a and 3b to the programmable controller 1 via the communication processing section 23.

Unless the two PIN codes match, the PIN code matching decision section 26 of the centralized controller 2 concludes that the PIN code transmitted from the programmable controller 1 is an invalid code, and transmits a control disabling signal, which inhibits the control of the unique function of the facility equipment 3a and 3b, to the programmable controller 1 via the communication processing section 23 (step ST19).

If the communication processing section 14 receives the control disabling signal from the programmable controller 1, the control information generating section 13 of the programmable controller 1 terminates the series of the processing. This is because even if it transmits the control information for the facility equipment 3a and 3b to the centralized controller 2, the control information is not accepted.

If the communication processing section 14 receives the control enabling signal from the programmable controller 1, the control information generating section 13 of the programmable controller 1 executes the sequence control program stored in the sequence control program storage section 11 (the sequence control program corresponding to the unique function of the facility equipment 3a and 3b), and generates the control information for the facility equipment 3a and 3b.

In the course of this, if the communication processing section 14 receives the state information about the facility equipment 3a and 3b from the programmable controller 1, the control information generating section 13 generates the control information for the facility equipment 3a and 3b while taking the state information into consideration.

When the control information generating section 13 generates the control information for the facility equipment 3a and 3b, the communication processing section 14 of the programmable controller 1 transmits the control information to the centralized controller 2.

Receiving the control information for the facility equipment 3a and 3b (control information for controlling the unique function of the facility equipment 3a and 3b) transmitted from the programmable controller 1, the communication processing section 23 of the centralized controller 2 outputs the control information to the PIN code matching decision section 26.

Unless it authenticates the PIN code as a valid code, the PIN code matching decision section 26 of the centralized controller 2 discards the control information even though it receives the control information for the facility equipment 3a and 3b from the communication processing section 23. In contrast, when it authenticates the PIN code as a valid code, it outputs the control information to the communication processing section 27 when it receives the control information for the facility equipment 3a and 3b from the communication processing section 23.

The control information generating section 22 of the centralized controller 2 executes the sequence control program stored in the sequence control program storage section 21 (sequence control program corresponding to the standard functions of the facility equipment 3a and 3b) to generate the control information for the facility equipment 3a and 3b, and outputs the control information to the communication processing section 27.

In the course of this, if the communication processing section 27 receives the state information about the facility equipment 3a and 3b, the control information generating section 22 generates the control information for the facility equipment 3a and 3b while considering the state information.

Receiving the control information for the facility equipment 3a and 3b from the PIN code matching decision section 26 (control information for controlling the unique function of the facility equipment 3a and 3b), the communication processing section 27 of the centralized controller 2 transmits the control information for the facility equipment 3a and 3b to the facility equipment 3a and 3b to control the unique function of the facility equipment 3a and 3b (step ST18).

In addition, receiving the control information for the facility equipment 3a and 3b from the control information generating section 22 (control information for controlling the standard functions of the facility equipment 3a and 3b), the communication processing section 27 of the centralized controller 2 transmits the control information for the facility equipment 3a and 3b to the facility equipment 3a and 3b to control the standard functions of the facility equipment 3a and 3b.

Receiving the state information from the facility equipment 3a and 3b, the communication processing section 27 of the centralized controller 2 outputs the state information to the PIN code matching decision section 26 and control information generating section 22.

As is clear from the foregoing description, the present embodiment 1 is configured in such a manner that the centralized controller 2 controls the facility equipment 3a and 3b according to the sequence control program corresponding to the standard functions of the facility equipment 3a and 3b, and that the centralized controller 2 receives the control information for controlling the unique function of the facility equipment 3a and 3b and the PIN code, which are transmitted from the programmable controller 1, and transmits, if the PIN code is a valid code, the control information to the facility equipment 3a and 3b. Thus, it offers an advantage of being able to cope with the unique function of the facility equipment 3a and 3b easily without using an expensive programmable controller.

More specifically, since the control is divided in such a manner that the centralized controller 2 handles the control of the standard functions of the facility equipment 3a and 3b and the programmable controller 1 deals with the control of the unique function of the facility equipment 3a and 3b, it is enough to develop only the sequence control program corresponding to the unique function of the facility equipment 3a and 3b for the programmable controller 1, and to install the sequence control program into the inexpensive, small capacity programmable controller 1. This offers an advantage of being able to realize the equipment management system at a low cost.

In addition, according to the present embodiment 1, to carry out the control of the unique function of the facility equipment 3a and 3b by the programmable controller 1, since the dealer has to purchase the PIN code for each centralized controller 2 from the facility equipment maker, the facility equipment maker can earn the development costs of the sequence control program offered to the dealer without fail. Furthermore, unauthorized copy of the sequence control program is void so that the cost becomes proportional to the volume of sales, which offers an advantage of facilitating the payment. As for the unique function of the facility equipment connected, unless it has the valid PIN code, it is excluded from the system by the PIN code. Thus, it becomes possible to prevent an unauthorized equipment program from making access to the system, and to prevent the facility from carrying out unnecessary equipment operation as a whole, and by extension to achieve stable freezing/air conditioning management.

Embodiment 2

Figure 6:
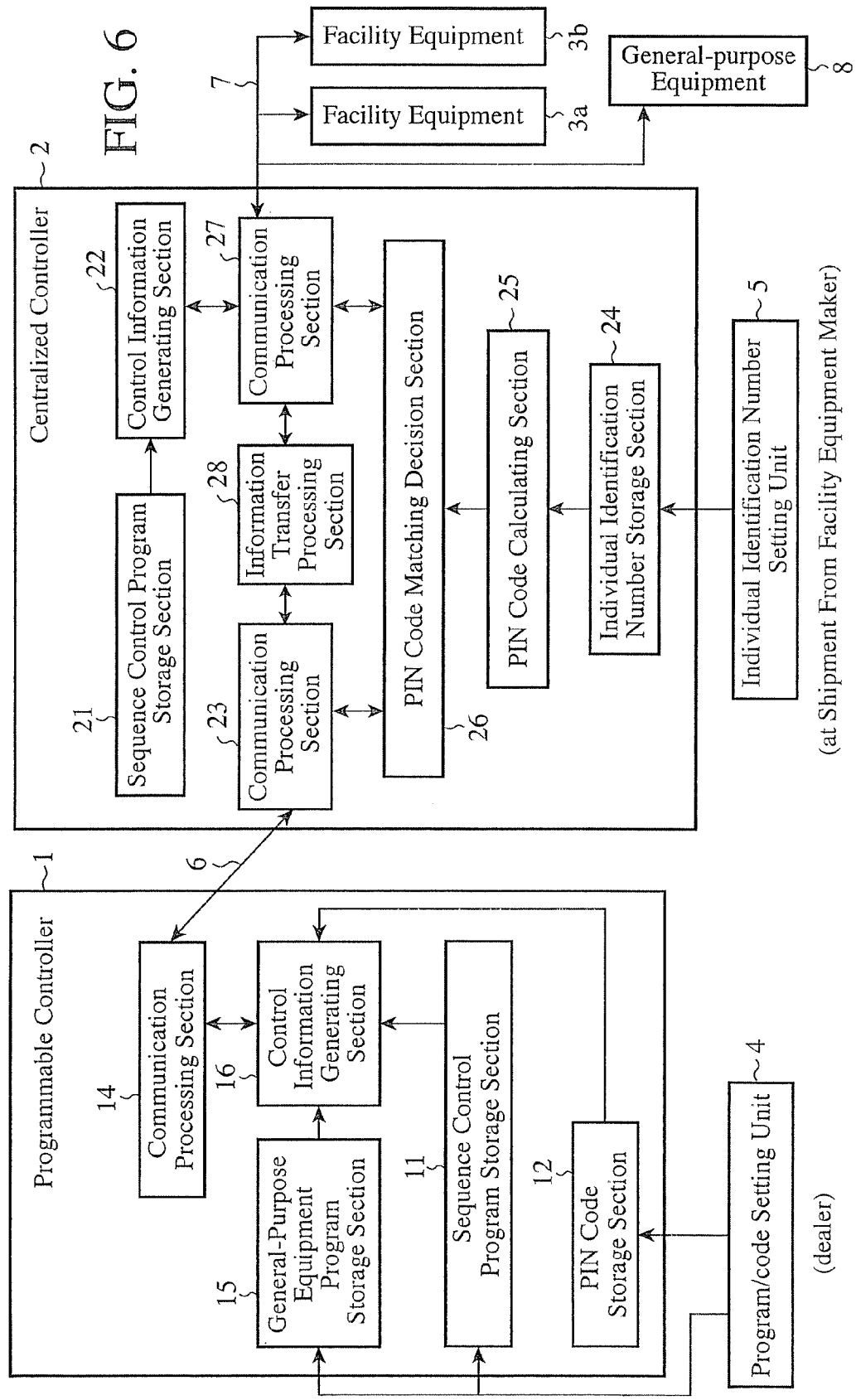
FIG. 6 is a block diagram showing a configuration of an equipment management system of an embodiment 2 in accordance with the present invention.
Figure 7:
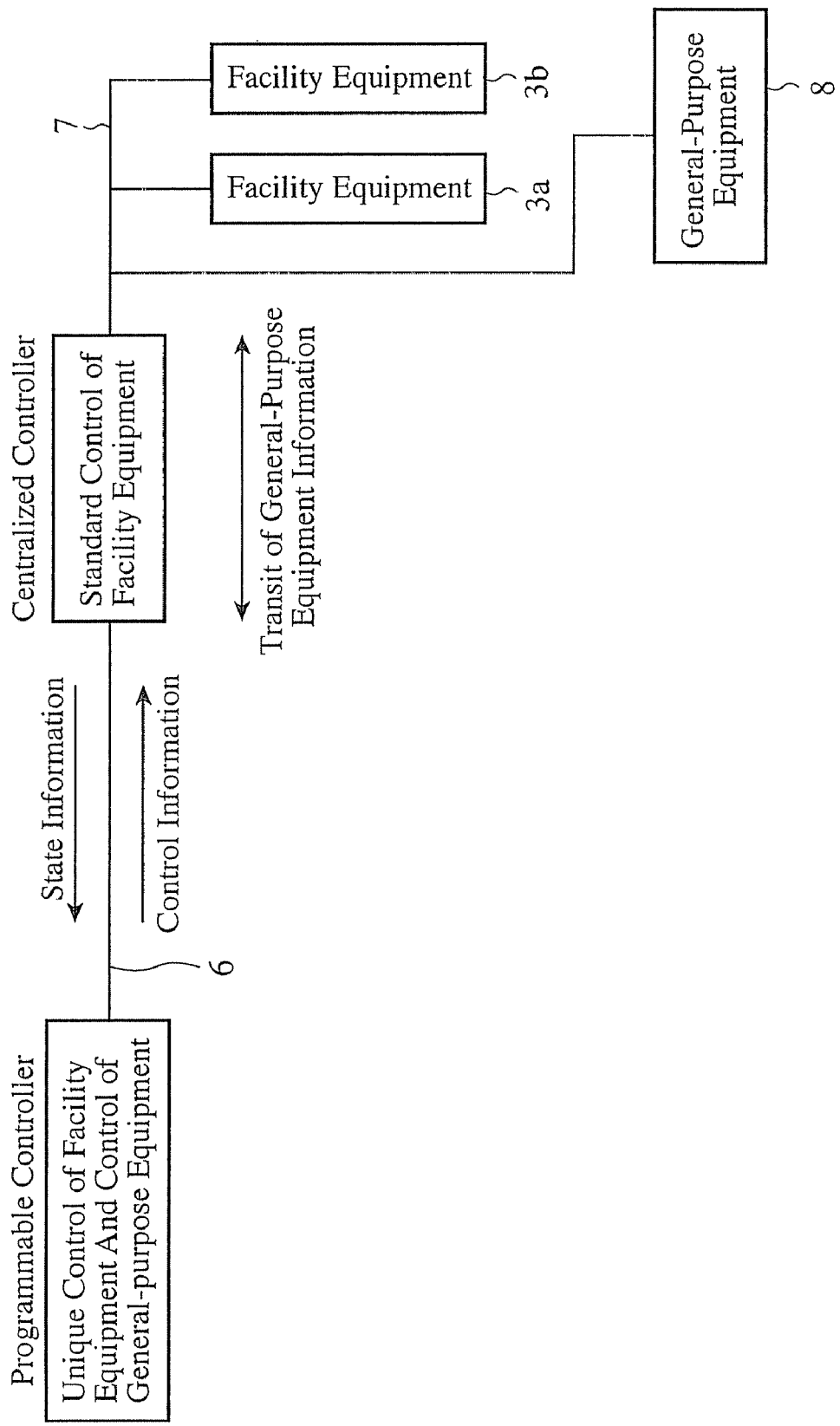
FIG. 7 is a diagram showing schematic operation of the equipment management system of the embodiment 2 in accordance with the present invention.

FIG. 6 is a block diagram showing a configuration of an equipment management system of an embodiment 2 in accordance with the present invention; and FIG. 7 is a diagram showing schematic operation of the equipment management system of the embodiment 2 in accordance with the present invention.

In these figures, the same reference numerals as those of FIG. 1 designate the same or like portions, and hence their description will be omitted here.

General-purpose equipment 8, which is a general-purpose apparatus (such as an air conditioner and refrigerator) the facility equipment maker of the facility equipment 3a and 3b does not produce, is connected to the centralized controller 2 via the transmission line 7.

In the example of FIG. 6, it is assumed that the general-purpose equipment 8 has a communication processing section for receiving the control information transferred from the centralized controller 2, and operates according to the control information received by the communication processing section. However, it is also possible to insert before the general-purpose equipment 8 a general-purpose equipment controller that has a communication processing section for receiving the control information transferred from the centralized controller 2, and a control section for controlling the general-purpose equipment 8 according to the control information received by the communication processing section.

A general-purpose equipment program storage section 15 of the programmable controller 1 is a memory that accepts the setting processing of the sequence control program by the program/code setting unit 4, and stores the sequence control program of the general-purpose equipment 8. Here, the general-purpose equipment program storage section 15 constitutes a storage means.

In the example of FIG. 6, although the general-purpose equipment program storage section 15 accepts the setting processing by the program/code setting unit 4, and stores the sequence control program of the general-purpose equipment 8, it can also store the sequence control program of the general-purpose equipment 8 in advance without the setting processing by the program/code setting unit 4.

A control information generating section 16 of the programmable controller 1, which is composed of a processing unit such as a CPU, carries out the processing of generating not only the control information for the facility equipment 3a and 3b by executing the sequence control program stored in the sequence control program storage section 11 in the same manner as the control information generating section 13 in FIG. 1, but also the control information for the general-purpose equipment 8 by executing the sequence control program stored in the general-purpose equipment program storage section 15; and the processing of outputting the control information for the facility equipment 3a and 3b and for the general-purpose equipment 8 and the PIN code stored in the PIN code storage section 12 to the communication processing section 14. Here, the control information generating section 16 constitutes a control information generating means.

When the communication processing section 23 receives the control information for the general-purpose equipment 8 from the programmable controller 1, an information transfer processing section 28 of the centralized controller 2 carries out processing of transferring the control information for the general-purpose equipment 8 to the general-purpose equipment 8 via the communication processing section 27.

However, another configuration is also possible in which the information transfer processing section 28 transfers the control information for the general-purpose equipment 8 received from the communication processing section 23 to the general-purpose equipment 8 only when the PIN code matching decision section 26 authenticates that the PIN code transmitted from the programmable controller 1 is a valid code.

Here, the information transfer processing section 28 constitutes a transmitting means.

Next, the operation will be described.

Although the foregoing embodiment 1 is described by way of example in which the programmable controller 1 transmits the control information for the facility equipment 3a and 3b to the centralized controller 2, another configuration is also possible in which the control information generating section 16 of the programmable controller 1 generates not only the control information for the facility equipment 3a and 3b, but also the control information for the general-purpose equipment 8 by executing the sequence control program stored in the general-purpose equipment program storage section 15, and transmits the control information for the general-purpose equipment 8 to the centralized controller 2.

When the communication processing section 23 receives the control information for the general-purpose equipment 8 from the programmable controller 1, the information transfer processing section 28 of the centralized controller 2 transfers the control information for the general-purpose equipment 8 to the general-purpose equipment 8 via the communication processing section 27 without performing any special processing, thereby carrying out the control of the general-purpose equipment 8.

However, the information transfer processing section 28 can transfer the control information for the general-purpose equipment 8 received by the communication processing section 23 to the general-purpose equipment 8 only when the PIN code matching decision section 26 authenticates that the PIN code transmitted from the programmable controller 1 is a valid code in the same manner as in the foregoing embodiment 1.

As is clear from the foregoing description, the present embodiment 2 is configured in such a manner that the programmable controller 1 generates the control information for the general-purpose equipment 8 by executing the control program of the general-purpose equipment 8, and transmits the control information for the general-purpose equipment 8 to the centralized controller 2; and that the centralized controller 2 transfers the control information transmitted from the programmable controller 1 to the general-purpose equipment 8. Thus, the present embodiment 2 offers an advantage of being able to achieve the control of the general-purpose equipment 8 without increasing the storage capacity of the centralized controller 2 or the amount of processing thereof.

In addition, when the general-purpose equipment 8 is installed near the facility equipment 3a and 3b, the programmable controller 1 and the general-purpose equipment 8 can be connected directly by laying a transmission line between them, which offers an advantage of being able to reduce construction costs.

Embodiment 3

Figure 8:
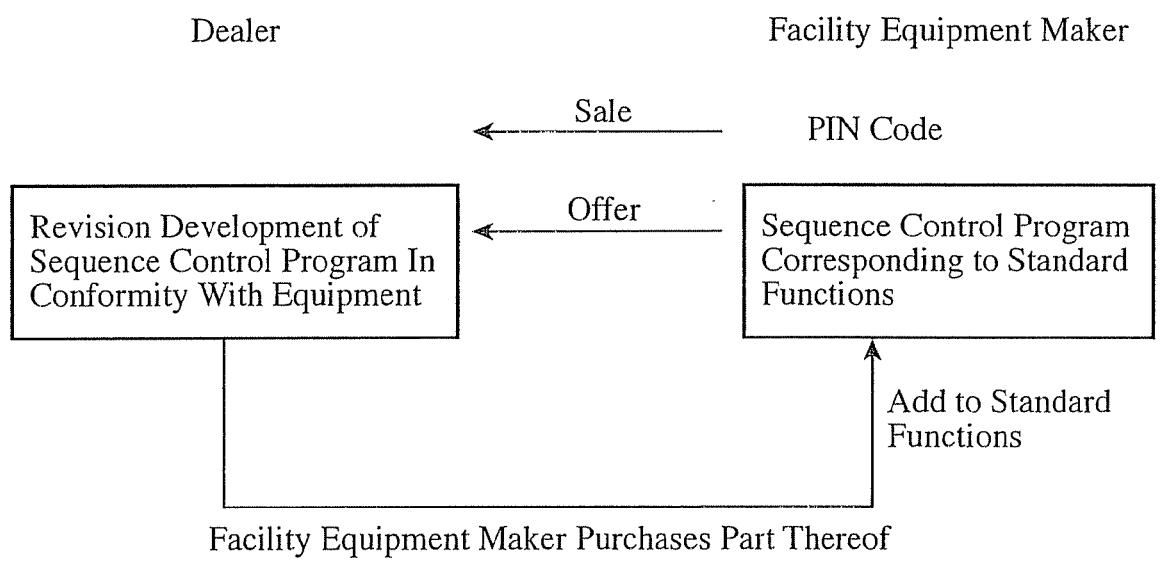
FIG. 8 is a diagram for explaining physical distribution of the equipment management system of an embodiment 3 in accordance with the present invention.

As for the sequence control program corresponding to the unique function of the facility equipment 3a and 3b, which is installed in the programmable controller 1, a description is made in the foregoing embodiments 1 and 2 that it is developed by revising the sequence control program corresponding to the standard functions provided by the facility equipment maker. However, as shown in FIG. 8, it is also possible for the facility equipment maker to purchase from the dealer a sequence control program having a function applicable to other equipment within the sequence control program corresponding to the unique function which is revised and developed by the dealer.

Then the facility equipment maker can provide all the dealers with the sequence control program it purchases from the dealer as the sequence control program corresponding to the standard functions. The facility equipment maker can earn the buying cost of the sequence control program by means of the distribution cost of the PIN code.

According to the present embodiment 3, the facility equipment maker purchases the sequence control program corresponding to the unique function, which has been revised and developed by the dealer. Thus, it can reduce the revision and development costs of the sequence control program by the dealer.

In addition, the facility equipment maker can increase the versatility of the sequence control program corresponding to the standard functions without developing the sequence control program of its own.

In addition, the facility equipment maker can earn the buying cost of the sequence control program by means of the distribution cost of the PIN code, thereby being able to prevent an increase in the load. Since the dealers are provided with a sequence control program corresponding to higher standard functions, they can reduce the development.

INDUSTRIAL APPLICABILITY

As described above, the equipment management system in accordance with the present invention is suitable for a system that necessitates controlling not only the standard functions of the facility equipment, but also the unique function of the facility equipment.

What is claimed is:

1. An equipment management system comprising:
a programmable controller that accepts setting of a control program corresponding to a unique function of facility equipment and setting of an identification code from a removable program/code setting unit, that generates control information for said facility equipment by executing the control program, and that transmits the control information for said facility equipment and the identification code; and
a centralized controller that controls said facility equipment according to a control program corresponding to a standard function of said facility equipment, that receives the control information and the identification code transmitted from said programmable controller, and that transmits the control information to said facility equipment only when the identification code from the programmable controller is a valid code for said facility equipment, the identification code being unique to each piece of the facility equipment and calculated from an individual identification number assigned to each piece of the facility equipment, the individual identification number being a manufacturer's serial number of the facility equipment, wherein
the programmable controller
detects a connection to the centralized controller and transmits the identification code accepted from the removable program/code setting unit to said centralized controller when the connection is detected,
generates the control information and then transmits the control information to said centralized controller when a control enabling signal that authorizes control of the facility equipment is received from the centralized controller, and
inhibits the transmission of the control information to said centralized controller when a control disabling signal that disables control of the facility equipment is received from the centralized controller, and
the centralized controller
receives the identification code and determines whether the identification code received is the valid code for said facility equipment or not,
generates the control enabling signal to the programmable controller which authorizes control of the facility equipment when the identification code from the programmable controller is determined to be the valid code, and
generates the control disabling signal to the programmable controller that disables control of the facility equipment when the identification code is determined not to be the valid code.

2. The equipment management system according to claim 1, wherein
said centralized controller accepts setting of the individual identification number of the facility equipment, calculates the identification code from the individual identification number, and authenticates that the identification code is the valid code so as to transmit the control information to said facility equipment only when the identification code calculated by said centralized controller matches the identification code transmitted from said programmable controller.

3. The equipment management system according to claim 1, wherein
said programmable controller generates the control information for general-purpose equipment by executing a control program of said general-purpose equipment, and transmits the control information for said general-purpose equipment to said centralized controller; and
said centralized controller transfers the control information transmitted from said programmable controller to said general-purpose equipment.

4. The equipment management system according to claim 3, wherein
said centralized controller transfers the control information transmitted from said programmable controller to said general-purpose equipment only when the identification code transmitted from said programmable controller is the valid code.

5. The equipment management system according to claim 2, further comprising:
an individual identification number setting unit for setting the individual identification number of said facility equipment to said centralized controller.

6. The equipment management system according to claim 2, wherein the individual identification number used to calculate the identification code is the manufacturer's serial number assigned to each piece of the facility equipment, and the calculation by said centralized controller converts the individual identification number.

7. The equipment management system according to claim 1, wherein the facility equipment are air conditioners and refrigeration equipment.

8. A programmable controller comprising:
   storage means for accepting, from a removable program/code setting unit, setting of a control program corresponding to a unique function of facility equipment and for accepting setting of an identification code, and for storing the control program and the identification code, the identification code being unique to each piece of the facility equipment and represents a calculation from an individual identification number assigned to each piece of the facility equipment, the individual identification number being a manufacturer's serial number of the facility equipment;
   control information generating means for generating control information for said facility equipment by executing the control program stored in said storage means; and
   communication means for transmitting the control information for said facility equipment generated by said control information generating means and the identification code stored in said storage means to a centralized controller, wherein
   the control information generating means
      detects connection of the communication means to the centralized controller,
      supplies the control information to the communication means when the connection is detected,
      causes the communication means to transmit the control information for said facility equipment to said centralized controller when a control enabling signal that authorizes control of the facility equipment is received from the centralized controller, and
      inhibits the communication means from transmitting the control information for said facility equipment to said centralized controller when a control disabling signal that disables control of the facility equipment is received from the centralized controller.

9. The programmable controller according to claim 8, wherein
   said control information generating means generates, when said storage means stores a control program of general-purpose equipment in addition to the control program corresponding to the unique function of said facility equipment, control information for said general-purpose equipment by executing the control program of said general-purpose equipment; and
   said communication means transmits the control information for said general-purpose equipment, which is generated by said control information generating means, to said centralized controller.

10. The programmable controller according to claim 8, wherein the individual identification number is the manufacturer's serial number assigned to each piece of the facility equipment.

11. The programmable controller according to claim 8, wherein the facility equipment are air conditioners and refrigeration equipment.

12. The programmable controller according to claim 8, wherein
   the control information is transmitted to the centralized controller over a first transmission line, and the control enabling signal and the control disabling signal from the centralized controller are received over the first transmission line.

13. A centralized controller comprising:
   facility equipment control means for controlling facility equipment according to a control program corresponding to a standard function of said facility equipment;
   receiving means for receiving control information and an identification code, which are transmitted from a programmable controller, the identification code being unique to each piece of the facility equipment and calculated from an individual identification number assigned to each piece of the facility equipment, the individual identification number being a manufacturer's serial number of the facility equipment;
   decision means for making a decision as to whether the identification code received by said receiving means is a valid code for said facility equipment or not, for generating a control enabling signal to the programmable controller that authorizes control of the facility equipment when the decision result indicates that the identification code is the valid code, and for generating a control disabling signal to the programmable controller that disables control of the facility equipment when the identification code is not the valid code; and
   transmitting means for transmitting, only when the decision result by said decision means indicates that the identification code is the valid code for said facility equipment, the control information received by said receiving means to said facility equipment.

14. The centralized controller according to claim 13, wherein
   said decision means accepts setting of the individual identification number of the facility equipment, calculates the identification code from the individual identification number, and makes a decision, when the identification code matches the identification code received by said receiving means, that the identification code is the valid code so as to transmit the control information to said facility equipment.

15. The centralized controller according to claim 14, wherein
   said transmitting means transfers, when said receiving means receives control information for general-purpose equipment, which is transmitted from the programmable controller, the control information to said general-purpose equipment.

16. The centralized controller according to claim 15, wherein
   said transmitting means transfers control information received by said receiving means to said general-purpose equipment only when the decision result by said decision means indicates that the identification code is the valid code.

17. The centralized controller according to claim 14, wherein the individual identification number used to calculate the identification code is the manufacturer's serial number assigned to each piece of the facility equipment, and the calculation by said decision means converts the individual identification number.

18. The centralized controller according to claim 13, wherein the facility equipment are air conditioners and refrigeration equipment.

19. The centralized controller according to claim 13, wherein
   the control information is received from the programmable controller over a first transmission line, and the control enabling signal and the control disabling signal are transmitted to the programmable controller over the first transmission line, and
   the control information is transferred to the facility equipment over a second transmission line.

* * * * *